(12) United States Patent
Fliss et al.

(10) Patent No.: US 10,919,246 B2
(45) Date of Patent: Feb. 16, 2021

(54) MOLD AND METHOD FOR FORMING A PRESSURIZED FLUID CHAMBER

(71) Applicant: NIKE, Inc., Beaverton, OR (US)

(72) Inventors: Eric L. Fliss, Vancouver, WA (US); Kenneth William Fricke, Portland, OR (US); Samuel Heinzman, Silverton, OR (US); Samuel Peter Levno, Santa Cruz, CA (US)

(73) Assignee: NIKE, Inc., Beaverton, OR (US)

( * ) Notice: Subject to any disclaimer, the term of this patent is extended or adjusted under 35 U.S.C. 154(b) by 217 days.

(21) Appl. No.: 16/086,268

(22) PCT Filed: Dec. 16, 2016

(86) PCT No.: PCT/US2016/067259
§ 371 (c)(1),
(2) Date: Sep. 18, 2018

(87) PCT Pub. No.: WO2017/106703
PCT Pub. Date: Jun. 22, 2017

(65) Prior Publication Data
US 2019/0217566 A1 Jul. 18, 2019

Related U.S. Application Data

(60) Provisional application No. 62/268,798, filed on Dec. 17, 2015.

(51) Int. Cl.
*B29D 35/12* (2010.01)
*B29C 51/26* (2006.01)
(Continued)

(52) U.S. Cl.
CPC ............ *B29D 35/128* (2013.01); *A43B 13/04* (2013.01); *A43B 13/189* (2013.01); *A43B 13/20* (2013.01);
(Continued)

(58) Field of Classification Search
CPC .... B29D 35/128; B29D 35/122; B29C 51/20; B29C 51/30; B29C 51/10; B29C 51/265;
(Continued)

(56) References Cited

U.S. PATENT DOCUMENTS 5,925,306 A 7/1999 Huang
5,993,585 A * 11/1999 Goodwin ............... A43B 7/144
156/145

(Continued)

FOREIGN PATENT DOCUMENTS

CN 101896086 A 11/2010
CN 104687640 A 6/2015
(Continued)

OTHER PUBLICATIONS

International Search Report and Written Opinion dated May 19, 2017 in International Patent Application No. PCT/US2016/067259, 21 pages.

(Continued)

*Primary Examiner* — Christopher T Schatz
*Assistant Examiner* — Cynthia L Schaller
(74) *Attorney, Agent, or Firm* — Shook, Hardy & Bacon L.L.P.

(57) ABSTRACT

A fluid chamber (20) for a shoe may be formed using pressure channels (190) in a forming mold (100A), eliminating the need to insert a nozzle or needles into the chamber for inflation. A fluid chamber so formed may have a smaller seal area than a chamber formed using an inflation needle, making the chamber more visually pleasing. Apparatus and methods for forming a fluid chamber in this fashion are disclosed.

13 Claims, 5 Drawing Sheets

(51) Int. Cl.
  A43B 13/20    (2006.01)
  B29C 51/00    (2006.01)
  B29C 51/12    (2006.01)
  B29C 51/36    (2006.01)
  B29C 51/42    (2006.01)
  B29C 51/20    (2006.01)
  B29C 51/30    (2006.01)
  A43B 13/18    (2006.01)
  A43B 13/04    (2006.01)
  B29C 51/10    (2006.01)
  B29L 31/50    (2006.01)

(52) U.S. Cl.
  CPC ........... *B29C 51/006* (2013.01); *B29C 51/10* (2013.01); *B29C 51/12* (2013.01); *B29C 51/20* (2013.01); *B29C 51/265* (2013.01); *B29C 51/30* (2013.01); *B29C 51/36* (2013.01); *B29C 51/421* (2013.01); *B29D 35/122* (2013.01); *B29C 51/105* (2013.01); *B29C 2791/006* (2013.01); *B29C 2791/007* (2013.01); *B29L 2031/504* (2013.01)

(58) Field of Classification Search
  CPC ....... B29C 51/006; B29C 51/12; B29C 51/36; B29C 51/421; B29C 51/105; B29C 2791/006; B29C 2791/007; B29L 2031/504; A43B 13/189; A43B 13/04; A43B 13/20
  See application file for complete search history.

(56) References Cited

U.S. PATENT DOCUMENTS

| | | |
|---|---|---|
| 6,129,799 A | 10/2000 | McGraw |
| 2009/0151195 A1 | 6/2009 | Forstrom et al. |
| 2012/0233878 A1* | 9/2012 | Hazenberg ........... B29D 35/128 36/29 |
| 2013/0263391 A1 | 10/2013 | Chao et al. |

FOREIGN PATENT DOCUMENTS

| | | |
|---|---|---|
| CN | 104902773 A | 9/2015 |
| JP | 2010036416 A | 2/2010 |
| JP | 2015000547 A | 1/2015 |

OTHER PUBLICATIONS

International Preliminary Report on Patentability dated Jun. 28, 2018 in International Patent Application No. PCT/US2016/067259, 12 pages.

Intention to Grant received for European Patent Application No. 16829455.1, dated Aug. 24, 2020, 7 pages.

* cited by examiner

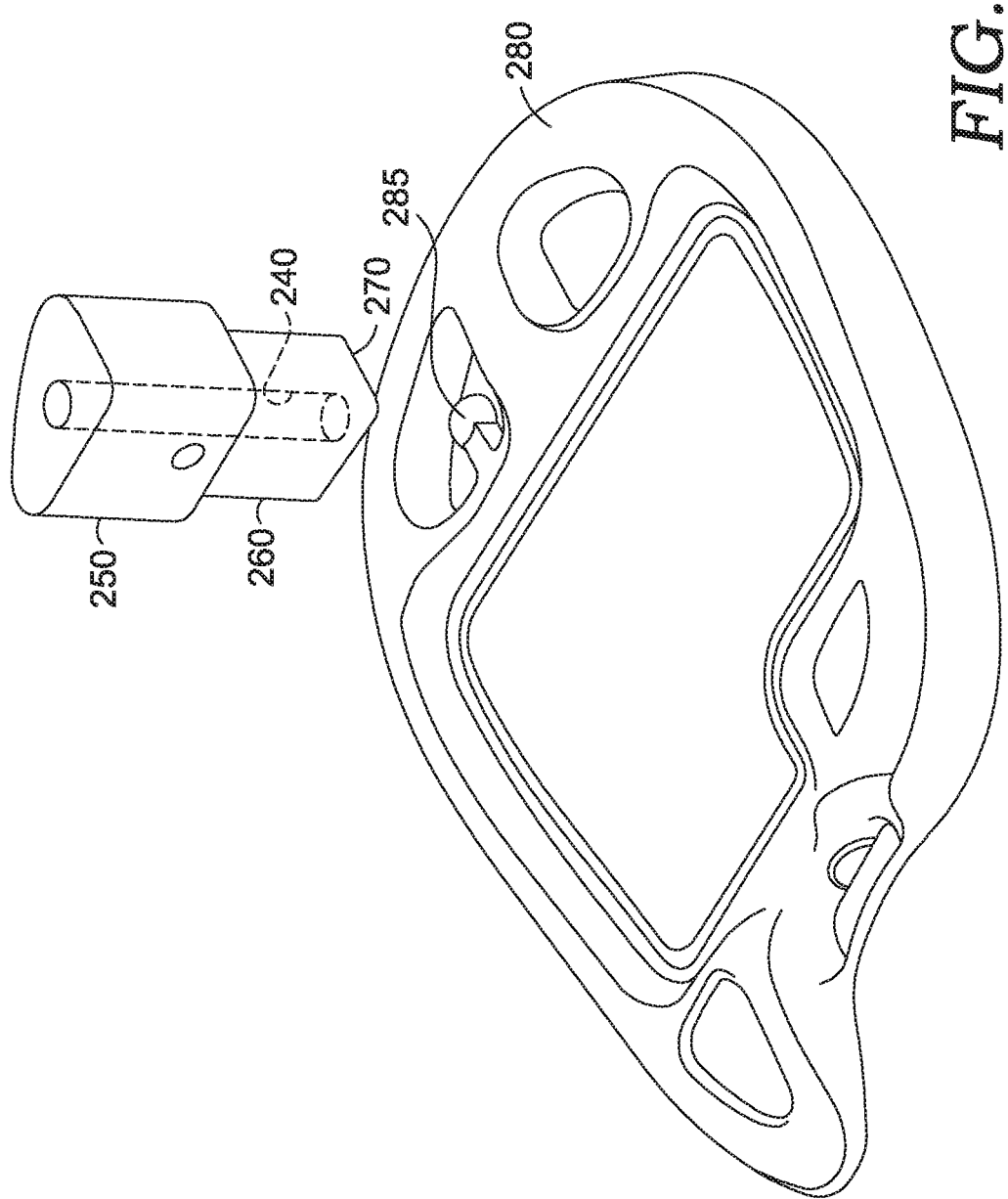

MOLD AND METHOD FOR FORMING A PRESSURIZED FLUID CHAMBER

CROSS-REFERENCE TO RELATED APPLICATIONS

This application claims priority under 35 U.S.C. § 365 to PCT/US2016/067259, filed on Dec. 16, 2016, entitled "Mold and Method for Forming a Pressurized Fluid Chamber," which claims priority to U.S. App. No. 62/268,798 filed on Dec. 17, 2015, entitled "Fluid Chamber for a Shoe," the entirety of the aforementioned applications are incorporated by reference herein.

BACKGROUND OF THE INVENTION

Shoes may have fluid-filled chambers in or near the sole of the shoe. The fluid-filled chambers may provide cushioning and/or impact protection. Such chambers have been incorporated into athletic and dress shoes. Some shoe designs have included visible air or gel chambers, which may help a consumer select a shoe with a fluid-filled chamber or chambers. If the chambers are hidden, it may be difficult for a consumer who likes the fluid-filled chambers to distinguish shoes having the fluid-filled chambers from shoes which do not have the fluid-filled chambers. Visible fluid-filled chambers may also be aesthetically pleasing, providing an interesting visual aspect to a shoe. Accordingly, it may be desirable to make at least a portion of a fluid-filled chamber visible in a finished shoe.

The chambers may be formed by inflating a space between two or more layers of membrane or film. The membrane or film may be formed into chamber, and a needle inserted into the chamber to pressurize the chamber. The hole through which the needle was inserted may then be sealed as the needle is withdrawn, as by heat welding.

BRIEF DESCRIPTION OF THE DRAWING

The detailed description below makes reference to the attached drawing figures, wherein:

FIG. 6 is a perspective view of an exemplary seaming apparatus.

DETAILED DESCRIPTION OF THE INVENTION

Figure 1:
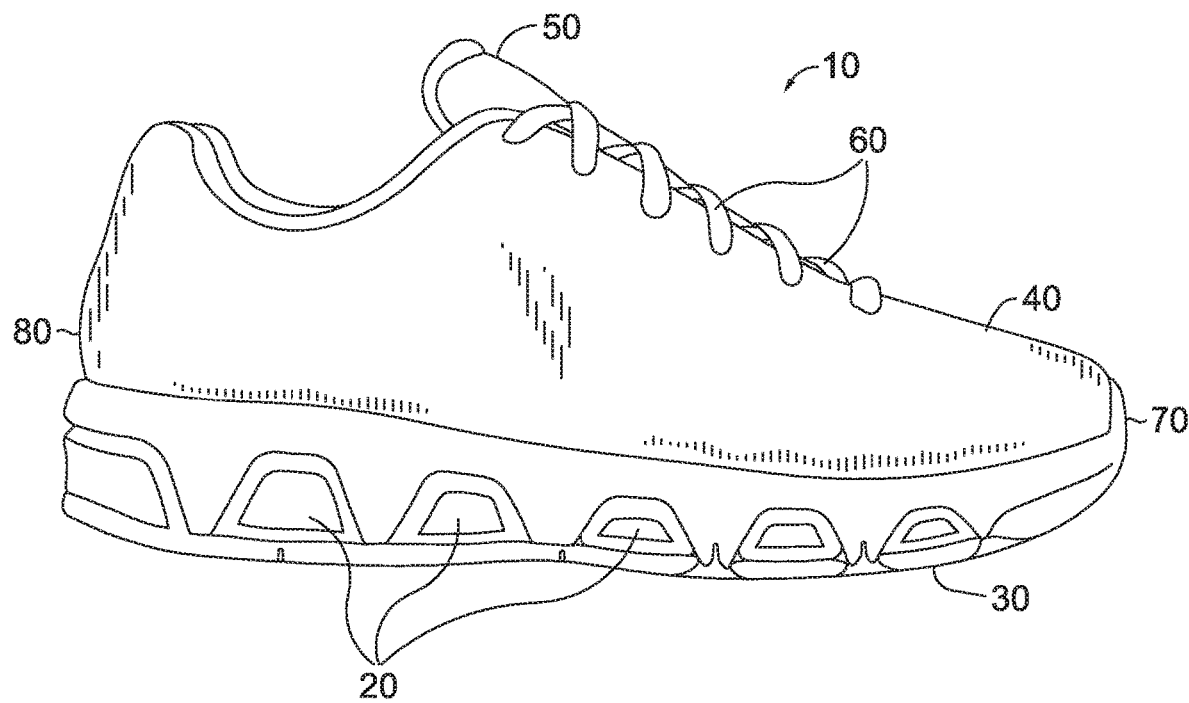
FIG. 1 is an exemplary shoe.

While processes of forming a membrane or film into a pocket, inserting a needle into the pocket to pressurize the pocket, and then sealing the pocket around the needle are effective for creating functional fluid-filled chambers, these processes often leave a large seam around the needle entry point. The seam may be visually distinct from the remainder of the chamber, and may be ugly or may look out of place, like the chamber was not formed properly. The inventors have observed that there remains a need for a chamber which has a more uniform appearance, so that the seam on the chamber is less of a constraint in aesthetic shoe design. The inventors have also observed that there remains a need for an apparatus and method for forming a chamber having a more uniform appearance.

In some aspects, this disclosure generally relates to a fluid-filled chamber for a shoe. The fluid-filled chamber may be formed using a thermoforming mold. Pliable materials such as, for example, thermoplastics can be used to form the fluid-filled chambers of the present disclosure. Various processes can be used to form (i.e., shape) the materials, such as vacuum forming and/or thermal forming. The vacuum forming of the material can be conducted by placing the pliable material in the mold, then applying vacuum and/or heat to the material. During the vacuum forming, a small hole may be formed in an area of the pliable material defining a chamber. Pressurized fluid can be delivered into the chamber through the hole formed in the pliable material without need to insert a needle or nozzle into the chamber. A seaming apparatus may be situated near the hole through which the pressurized fluid is delivered. During or just after the delivery of the pressurized fluid, the seaming apparatus may close the small hole. Because the hole is small and because the seam does not need to be formed around another structure, such as a needle or nozzle, the seam may be smaller than the seams in conventional chamber formation. This may provide a chamber with a more uniform appearance. The more uniform appearance may make the chamber suitable for shoe designs where large portions of the surface area of the chamber are visible in the finished shoe. The formation process may also facilitate the placement of the chamber seam on an interior-facing portion of the chamber, further increasing the surface area of the chamber suitable for visual presentation.

In some aspects, the disclosure relates to a mold for forming a pressurized fluid chamber. The mold may comprise a generally planar region, and a dome-like depression within the planar region. The mold may further comprise a compression area bounding the generally planar region and protruding upwardly from a front surface of the mold such that the compression area is raised relative to the generally planar region. The mold may further comprise a channel through at least two of the generally planar region, the dome-like depression, and the compression area. The channel may be in fluid communication with an area of the mold beyond the compression area. The channel may be disposed through all three of the generally planar region, the dome-like depression, and the compression area. In either embodiment of the channel, the dome-like depression may comprise an oculus that opens through a rear-facing side of the mold to an exterior of the mold. The dome-like depression may have a diameter between 4 mm and 8 mm. The oculus may have a diameter between 2.7 mm and 5.5 mm.

In some aspects, the disclosure relates to a system for inflating a thermoformed fluid chamber. The system may comprise a mold. The mold may comprise a cavity forming plate and a cap plate. The cavity forming plate may comprise a relief area. The cavity forming plate may comprise an opening within the relief area. The opening may be in fluid communication with an exterior of the mold. The cavity forming plate may comprise a compression area. The compression area may bound the relief area and protrude upwardly from a front surface of the mold such that the compression area is raised relative to the relief area. The cavity forming plate may comprise one or more venting apertures outside the compression area. The cap plate may comprise an aperture in fluid communication with the opening of the cavity forming plate. The cap plate may further comprise raised regions corresponding to the one or more venting apertures in the cavity forming plate and protruding upwardly from a front surface of the cap plate. The cap plate may further comprise one or more pressure channels, the pressure channels in fluid communication with the aperture. The system may further comprise a seaming apparatus. The seaming apparatus may be situated external to the mold.

In any embodiment of the system, the one or more pressure channels may alternately deliver vacuum and positive pressure. The system may further comprise an air pressure delivery tube. The air pressure delivery tube may be integral to the seaming apparatus. The seaming apparatus may completely surround the circumference of the air pressure delivery tube. The seaming apparatus may comprise two or more welding heads.

In any of these embodiments, the cavity forming plate may further comprise a partial opening through at least a portion of at least one edge of the relief area and compression area. The partial opening may be in fluid communication with an area of the mold outside the boundary of the compression area. In any of these embodiments, the seaming apparatus may employ energy selected from heat, ultrasound, and radio frequency. In any of these embodiments, the air pressure delivery tube may deliver fluid under a pressure between 1 and 50 psig. In any of these embodiments, the relief area may be generally planar. In any of these embodiments, the opening may be concave relative to the relief area. In any of these embodiments, the opening may be round.

In some aspects, the disclosure relates to a method for inflating a thermoformed chamber. The method may comprise applying a vacuum to a confined portion of a pliable material until the material ruptures to form an opening in the material. The method may comprise delivering a pressurized fluid to the pliable material through the opening. The method may comprise sealing the opening while the pliable material is pressurized. The method may be performed without inserting anything other than pressurized fluid into the opening. The pliable material may be thermoplastic polyurethane. The pliable material may be pliable at room temperature. The method, in any of these embodiments, may further comprise thermoforming the pliable material. The pliable material may be pliable during some portion of the thermoforming process.

In any of these embodiments, the opening in the pliable material may be greater than 0 mm and less than approximately 3.5 mm in maximum dimension. In any of these embodiments, the pressurized fluid may be a gas. The pressurized fluid may be selected from air, nitrogen, octafluorapropane, hexafluroethane, sulfur hexafluoride, and combinations thereof. In any of these embodiments, the pliable material may form a chamber around the opening. The chamber may be inflated and pressurized by delivering the pressurized fluid to the pliable material through the opening. The chamber may be at least partially inflated prior to delivering the pressurized fluid to the pliable material through the opening. In any of these embodiments, the chamber may be pressurized to about 1-51 psig. In any of these embodiments, the opening may be sealed using heat stack, ultrasound, or radio frequency seaming. The sealing may begin while the pressurized fluid is delivered into the pliable material. The sealing may be finished concurrent with completion of the delivery of the pressurized fluid. In any of these embodiments, the pliable material may have a single-ply thickness between 1 and 3 mm.

In some aspects, the present disclosure relates to a component for a shoe made according to any of these methods. The component for a shoe may form all or a part of the sole of the shoe. The component may be an insert between the interior of the shoe and the sole of the shoe. In any of these embodiments, the shoe may comprise a window through which the component is visible when the shoe is fully assembled. In any of these embodiments, substantially all exterior-facing surfaces of the component may be visible through the window when the shoe is fully assembled. Substantially all of the exterior-facing surfaces of the component may be visible through the window when the shoe is fully assembled, except for the bottom-facing surface.

In any of these embodiments, the component for a shoe may have a seal area created by sealing the opening. The seal area may be positioned on the component such that the seal area is not visible when the shoe is fully assembled. The seal area may be positioned on an internal-facing surface of the component when the shoe is fully assembled. The seal area may be covered by another shoe structure when the shoe is fully assembled. The seal area may be greater than 0 mm and less than approximately 3.5 mm in maximum dimension.

Additional variations, objects, advantages, and novel features of the disclosure will be set forth in part in the description which follows, and in part will become apparent to those skilled in the art upon examination of the following, or may be learned by practice of the disclosure.

As used in this disclosure, "any of" means any combination of the recited claims and/or disclosed elements, including any combination of 2 or more of the recited claims or elements, and also including any one of the recited claims or elements. As a non-limiting example, a claim reciting a method according to any of claims 100 to 105 includes a combination of the claimed method elements with the claimed method elements of any of claims 100-105 individually, or with any subcombination of claims 100-105, or with all of claims 100-105.

As used in this disclosure, "fluid" refers to a gas, liquid, gel, or combination thereof, suitable for use in a shoe chamber for cushioning or impact protection. Exemplary fluids include, without limitation, air, nitrogen, octafluorapropane, hexafluorethane, sulfur hexafluoride, and combinations thereof.

As used in this disclosure, "vacuum" refers to a controlled reduction in local air pressure relative to atmospheric pressure at the same elevation and temperature. As used in this disclosure, "positive pressure" refers to a controlled increase in the pressure of a substance, such as a fluid, relative to the pressure of the fluid in an open container (unrestricted volume) at the same elevation and temperature.

As used in this disclosure, "front" or "internal", in relation to a mold, refers to the side or face of the mold that is or includes the material-contact portion of the mold, e.g., the surface to which the molded material is molded, which may also be called the forming cavity. As used in this disclosure, "rear", "back" or "external", in relation to a mold, refers to the opposite side or face of a mold or forming plate from the internal side or face. The external portion of a mold or cavity forming plate may be connected to other apparatus related to the forming process, such as heaters, sources of pressure, sources of vacuum, positioning machinery, etc. A forming cavity may be open—there may be no machine or tool cover for the forming cavity during the forming process—or enclosed—either capped by another tool or plate or enclosed within a larger machine during at least a portion of the forming process.

FIG. 1 is a side view of an exemplary shoe 10 having visible, fluid-filled chambers 20 in or near the sole 30 of the shoe 10. Shoe 10 also has an upper 40, including a tongue 50 and closure 60. As illustrated, closure 60 comprises shoelaces looped through eyelets on opposing sides of tongue 50, however, any suitable closure method could be used, including, without limitation, stretch materials, hook-and-loop fasteners, or other mechanical fasteners, such as snaps, buttons, zippers, etc. Between sole 30 and upper 40, on the inside of the shoe, there may be additional elements (not shown) for comfort and/or additional cushioning, such as a sock liner and/or foam padding. Exemplary shoe 10 has the general shape of a running or athletic shoe, however, the chambers disclosed could be used in any variety of footwear, including slippers, dance shoes, casual shoes, dress shoes, boots, and the like. Of course, different varieties of athletic shoes might also include chambers as disclosed, including, without limitation, running shoes, basketball shoes, cross-training shoes, fitness shoes, ski boots, skateboarding shoes, and the like.

Figure 2:
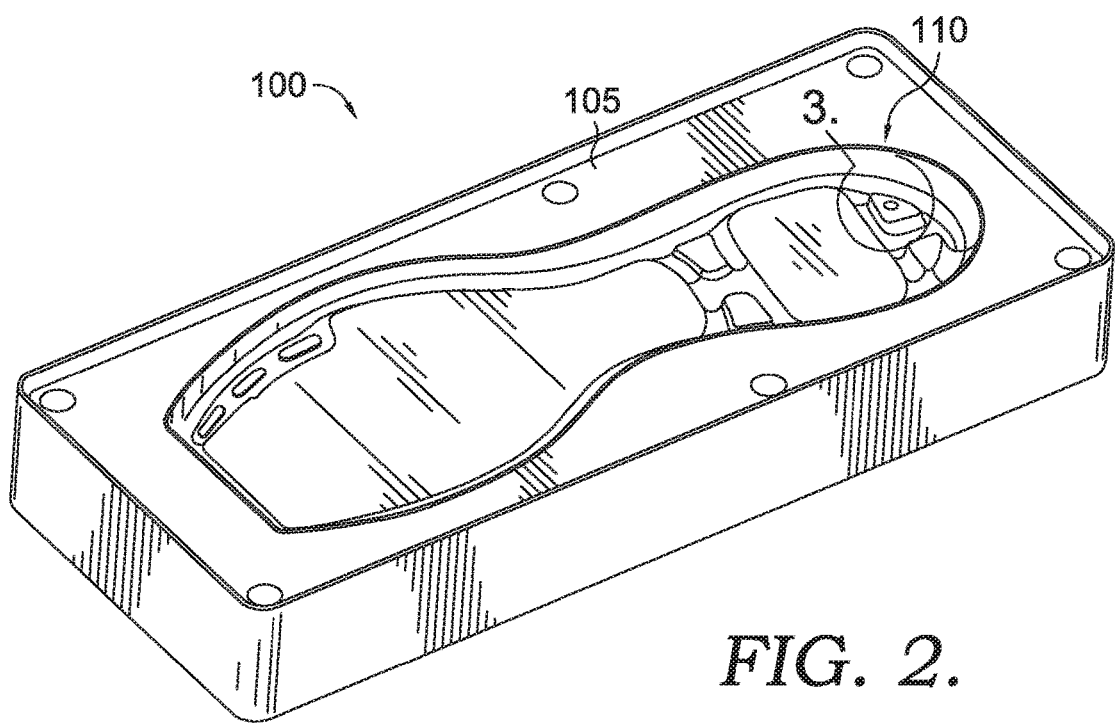
FIG. 2 is an exemplary cavity forming mold for a shoe sole.

FIG. 2 shows an exemplary mold 100 for forming a shoe sole 30 or portion thereof comprising a fluid-filled chamber 20. Mold 100 comprises a cavity forming plate 105 on an internal surface of mold 100. As shown in FIG. 2, cavity forming plate 105 has a chamber-forming feature 110 positioned generally near the heel portion of the sole, however, chamber-forming feature 110 can be positioned in any desirable location. A single, continuous chamber-forming feature 110 may be used, or two or more discrete chamber-forming features 110, for example, between 2 and 16 chamber-forming features, or between 2 and 8 chamber-forming features, or between 2 and 6 chamber-forming features, may be used. An odd number of chamber-forming features may be used. The chamber-forming features, if more than one chamber-forming feature is used, may be of the same or similar size and shape, or may be of different sizes and shapes. For example, as shown in FIG. 1, chambers 20 near the toe 70 of the shoe may be somewhat smaller than chambers 20 near the heel 80 of the shoe.

Figure 3:
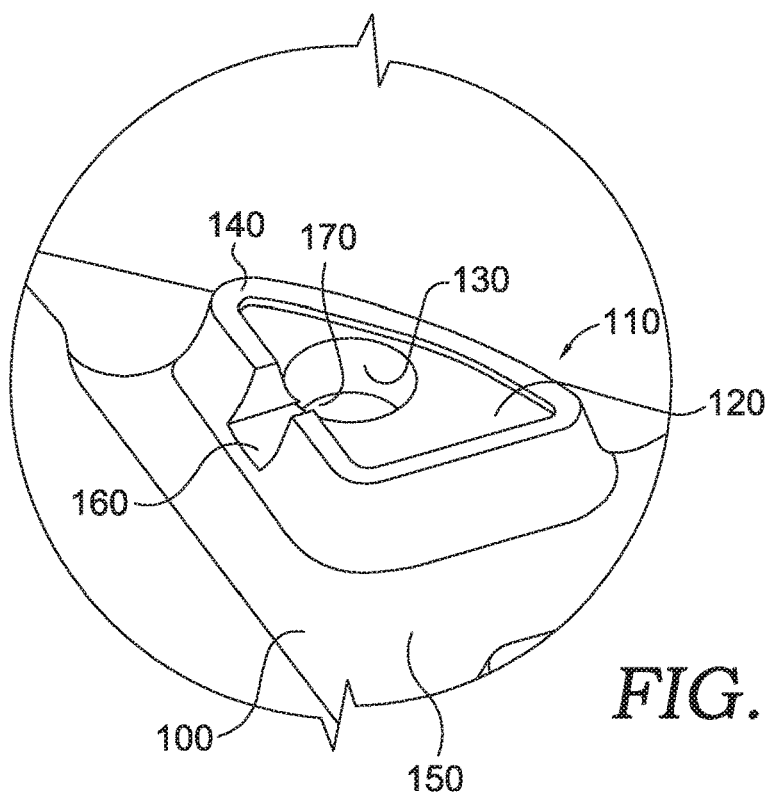
FIG. 3 is an exemplary mold feature for forming a chamber.

FIG. 3 shows a detailed view of the chamber-forming feature 110. Chamber forming feature 110 presents a generally planar region 120, and a dome-like depression 130 within generally planar region 120. The generally planar region 120 need not be strictly planar, however, it should provide a small, localized area of limited shape complexity to facilitate the formation of a small hole in a material within the mold, as described below. Instead of generally planar region 120, other shapes or topography may be suitable to serve as a relief area, depending on the materials and processes (e.g., thermoforming, vacuum forming, casting, etc.) used. Generally planar region 120 may be planar within typical industry tolerances for machining the mold 100. Generally planar region 120 may be bounded by a compression area 140. Compression area 140 may protrude upwardly from a front surface 150 of mold 100, and may be raised relative to generally planar region 120. As shown in FIG. 3, generally planar region 120 may also be raised relative to front surface 150 of mold 100. A channel 160 may run through generally planar region 120, dome-like depression 130, and compression area 140. In some embodiments, channel 160 may run through only one of generally planar region 120, and compression area 140, for example, through generally planar region 120 and dome-like depression 130, or through compression area 140 and dome-like depression 130. Channel 160 may provide fluid communication between the chamber-forming feature 110 of mold 100 and a vacuum and/or pressure source exterior to mold 100, as described below.

Dome-like depression 130 may be circular or oval or other shapes. A rounded shape may be preferred, but is not required. Dome-like depression 130 may comprise an oculus 170 that opens to an exterior surface (not shown) of mold 100. The diameter of the oculus, if round, may be between 2 mm and 8 mm, or between 2.7 mm and 5.5 mm, inclusive of endpoints. The diameter of the oculus may be 2 mm or greater and less than the maximum diameter of the dome-like depression. If the opening in the depression is not round, the opening may be of a similar area.

Figure 5:
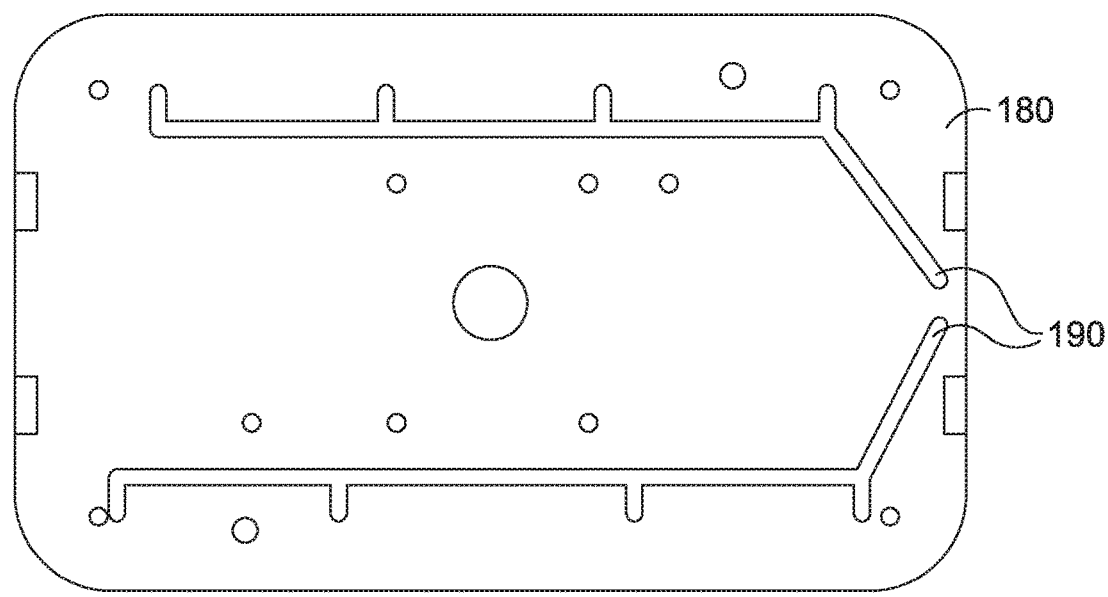
FIG. 5 is a top view of an exemplary cap plate.
Figure 4:
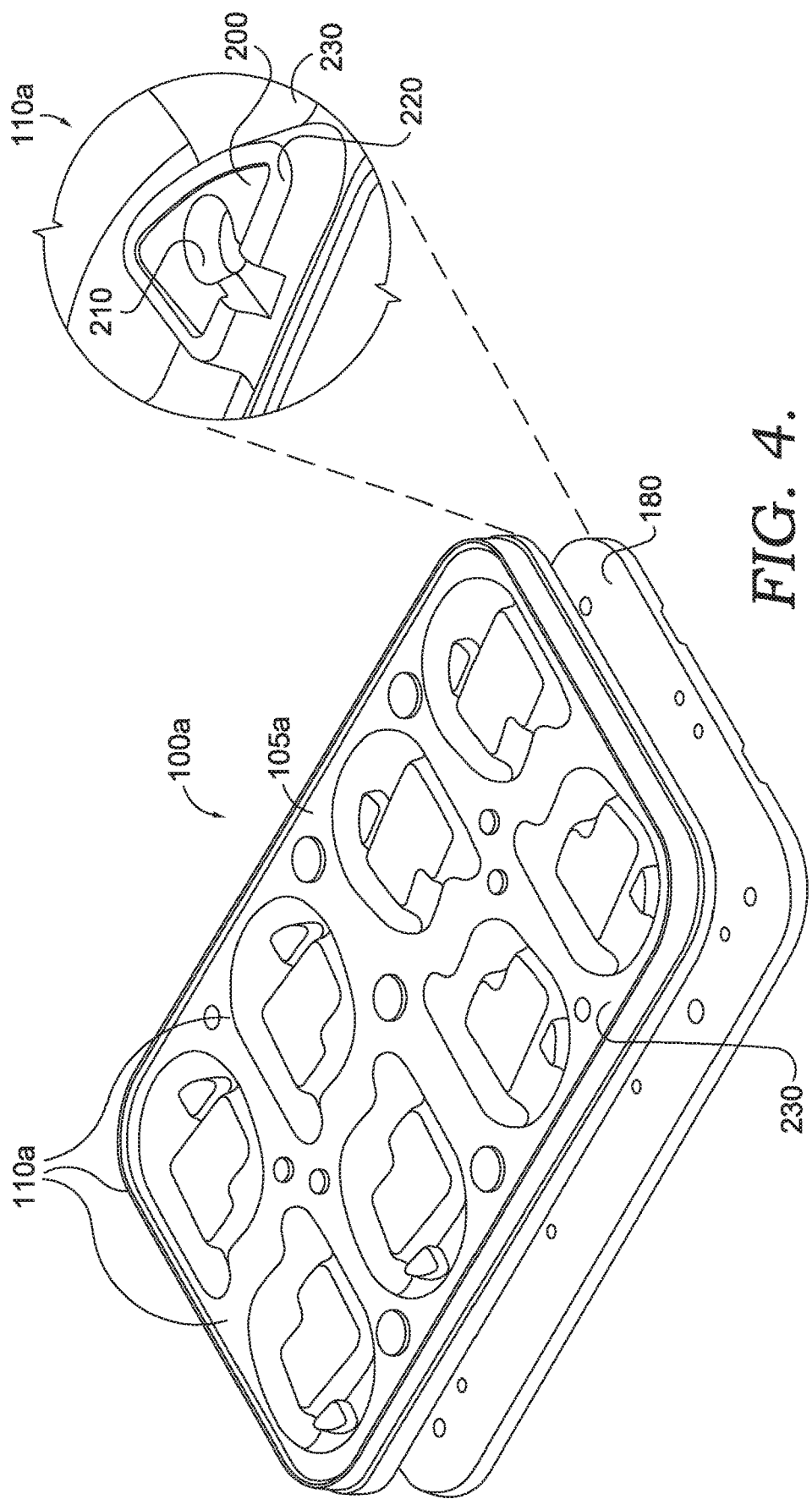
FIG. 4 is an exemplary mold and cap plate.

Mold 100a may comprise a cavity forming plate 105a and a cap plate 180, as shown in FIG. 4. As shown in FIG. 4, mold 100a may comprise multiple chamber-forming features 110a, however, a cap plate may also be used with a singular mold or with a chamber-forming feature 110 incorporated into a mold 100 for part of all of a sole 30, as shown in FIG. 2, an entire shoe, or other component(s) of a shoe. Cap plate 180 may fit against the exterior surface of cavity forming plate 105a. Cap plate 180 may have pressure channels 190, as shown in FIG. 5. Two pressure channels 190 are shown. A single pressure channel 190 or multiple pressure channels 190, such as three, four, five, six, seven, or eight pressure channels 190, may be used. A unique pressure channel 190 may be used for each chamber-forming feature 110a in corresponding mold 100a. Pressure channels 190 may serve as vacuum delivery tubes for forming an opening in a material inside the mold, as described below. Pressure channels 190 may be able to alternately deliver vacuum and positive pressure. For example, pressure channels 190 may be connected to a pump capable of generating positive and negative pressure, or may have connections to both a vacuum pump and a pressure pump.

Chamber-forming feature 110a, similar to chamber-forming feature 110 but oriented differently in mold 100a, may comprise a relief area 200 and an opening 210 within relief area 200. Relief area 200 may be generally planar. Opening 210 may be in fluid communication with the exterior of mold 110a (not shown). Chamber-forming feature 110a may further comprise a compression area 220, bounding relief area 200 and protruding upwardly from front surface 230 of mold 110a. Compression area 220 may be raised relative to relief area 200, which may itself be raised relative to front surface 230 of mold 110a. Opening 210 may be concave relative to relief area 200. Opening 210 may be positioned solely in the relief area 200, and/or may extend through at least a portion of the compression area 220. In relation to compression area 220, opening 210 may be partial, meaning that opening 210 does not extend through the entire depth of the structure as raised above the surface of mold 110a. If the opening 210 is partial and runs through compression area 220 there may be a "bridge" of compression area 220 that runs over or under opening 210. Mold 110a may further comprise one or more venting apertures outside compression area 220, as are known in conventional vacuum-forming and blowing processes. Opening 210 is distinct from and does not share the function of a venting aperture or venting apertures, if venting apertures are used.

Cap plate 180 may be fitted against mold 100a such that pressure channel 190 is in fluid communication with opening 210 in cavity forming plate 105a of mold 100a when cap plate 180 is situated against the exterior surface of cavity forming plate 105a. Cap plate 180 may comprise raised regions (not shown) corresponding to one or more venting apertures in cavity forming plate 105a. The raised regions may protrude upwardly from a front surface of cap plate 180, where front surface of cap plate 180 is the surface that mates with the rear or exterior surface of mold 100a. Cap plate 180 is presented as a unitary plate, however, if more than one pressure channel 190 is used, multiple, distinct cap plates 180 may also be used. For example, there may be a separate cap plate 180 for each pressure channel 190, and/or for each chamber-forming feature 110a, or for a subset of pressure channels 190 and/or chamber-forming features 110a.

A system for forming a fluid-filled chamber may have at least one mold 110a, with mold 110a having at least one cavity forming plate 105a, at least one cap plate 180, and, as shown in FIG. 6, a pressure delivery and seaming tube 250. Pressure delivery and seaming tube 250 may be positioned on an opposite surface of a formed part 280 relative to cavity-forming plate 105a (not shown in FIG. 6), proximate a hole in formed part 280 corresponding in position to the position of oculus 170 or opening 210. Pressure delivery and seaming tube 250 includes an air supply port 240 and a seaming head 260. These are illustrated in FIG. 6 as a unitary structure, however, air supply port 240 and seaming head 260 could also be separate structures.

Air supply port 240 may be in fluid communication with an opening 285 in a part 280 formed using chamber-forming feature 110a from the front surface of the formed part (i.e., the portion of formed part 280 that was facing away from mold 100a during forming). In some embodiments, air supply port 240 may be moved into and out of fluid communication with opening 285 in formed part 280 during the course of the molding process. For example, air supply port 240 may be mounted on a reciprocating or multi-axis arm that moves air supply port 240 during the molding process. Alternately, formed part 280 may be moved to air supply port 240, which may be distinct from mold 110a. For example, air supply port 240 may be a component of a separate machine and/or a separate manufacturing station from mold 110a. If formed part 280 is moved to air supply port 240, formed part 280 may be removed from mold 110a prior to or while moving formed part 280.

Air supply port 240 may serve as a pressure delivery tube. Air supply port 240 or a pressure delivery tube are distinguishable from needles or nozzles used conventionally to fill fluid-filled chambers for shoes at least in part because the air supply port or pressure delivery tube do not need to enter the chamber to pressurize it.

As shown in FIG. 6, seaming head 260 is integral with air supply port 240, and therefore has the same proximity to formed part 280 as air supply port 240. In other embodiments, seaming head 260 may be a separate structure which moves independently of air supply port 240. For example, seaming head 260 may be a heat-welding surface that is brought into proximity with formed part 280 only at or near the time to seal an opening 285 in formed part 280, and seaming head 260 may be relatively remote from formed part 280 during other parts of the process. Seaming head 260 may be a radio frequency electrode or ultrasound source which can be quickly and easily activated and deactivated during the molding process, in which case there might be no need to change the proximity of seaming head 260 to formed part 280 during the process. As shown in FIG. 6, seaming head 260 may have a contact perimeter 270 that is slightly larger than air supply port 240. As also shown in FIG. 6, it is not necessary for seaming head 260 to have the same shape or general configuration as air supply port 240. Seaming head 260 may have the same general shape or size of relief area 200, within compression area 220. Seaming head 260 may have a contact perimeter that is larger than air supply port 240 and smaller than the outer bound of compression area 220. The perimeter of seaming head 260 is described as a contact perimeter, however, it will be understood by one of skill in the art that it may not be necessary for seaming head 260 to actually contact formed part 280 in order to form a functional seal of opening 285 in formed part 280. Seaming head 260 may provide a continuous contact perimeter, or may have small gaps or discontinuities in the perimeter if the material being seamed and the seaming energy source used permit the formation of a complete, functional seal without a continuous contact perimeter. For example, it may be possible to achieve a functional, continuous heat seal without applying heat along the entire seal—heat applied to discrete points near the seal may be sufficient to form a continuous seal. Two or more seaming heads 260 may be used, and if two or more seaming heads 260 are used, they may be incorporated into a unitary structure (e.g., built into an seaming tube, with or without air supply port 240), or may be discrete structures.

Figure 7:
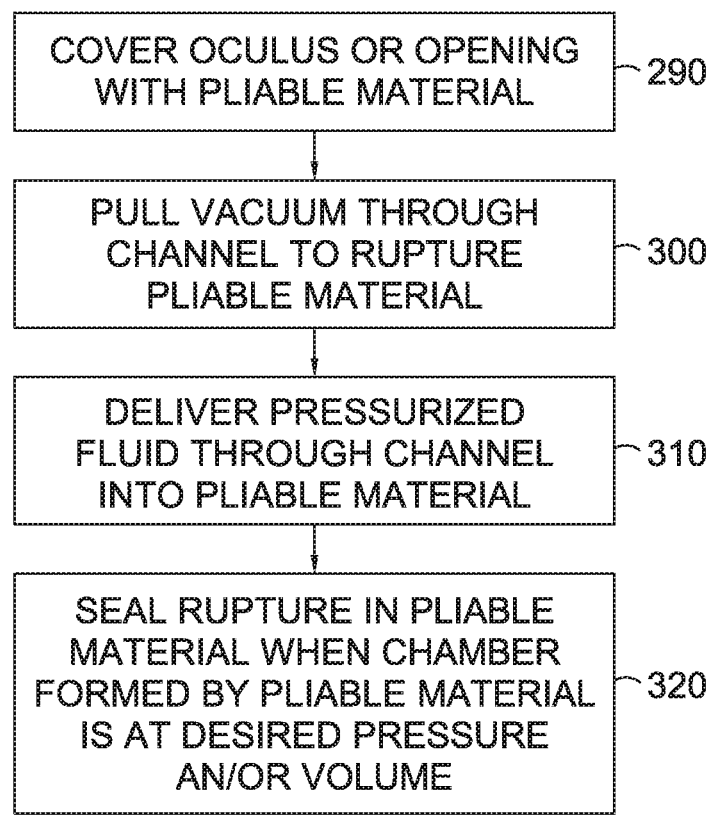
FIG. 7 is a flowchart for a process for forming a fluid-filled chamber.

A fluid-filled chamber 20 may be formed using a pliable material, as shown in FIG. 7. The pliable material may be thermoplastic, or thermoset, i.e., the material may be pliable only under certain conditions, such as in a certain temperature range. The pliable material may be introduced into a mold 100 or 100a such that at least part of the material covers oculus 170 or opening 210 in mold 100 or 100a, as represented in step 290. Vacuum may be applied to generate air flow inside mold 100 or 100a through channel 160 toward the exterior of mold 100 or 100a, through the pliable material. Oculus 170 or opening 210 may focus the air flow to create a relatively high speed flow against a relatively small area of the pliable material until the pliable material ruptures, as represented in step 300. The area of the pliable material most affected by the vacuum may be influenced by the size of oculus 170 or opening 210. The rate and volume of air flow required to rupture the material will depend upon the particular material and conditions used. The pliable material may be heated before or while it is ruptured in this way, e.g., by heating the material before putting it in the mold, heating the mold, providing a heat source adjacent to the material and/or the mold, or combinations thereof. The vacuum applied to rupture the material may be greater in magnitude than the vacuum used to hold the material against the mold during the initial forming process.

Once the material is ruptured, pressurized fluid may be delivered through channel 160 and oculus 170 or opening 210 into the material, as shown in step 310. The material may have been formed into a chamber or inflated before the pressurized fluid is introduced, or the chamber may be formed or formation of the chamber may be completed by the pressurized fluid pushing the material against the interior of cavity forming plate 105 or 105a. The material may also be pushed outwardly, away from the interior of cavity forming plate 105 or 105a, forming an inflated fluid-filled chamber.

Pressure channels 190 may serve as a vacuum delivery tube. Pressure channels 190 may also provide a vacuum greater in magnitude than the vacuum used, if any, to form or begin forming the part (i.e., a pressure lower than the forming vacuum pressure, or a fluid flow rate greater than that used to form the part). The air flow generated through pressure channels 190 may be greater than 0 Liters/second (L/sec) and less than about 6 L/sec. Higher air flow rates may be desirable with some processes, systems, and/or materials. The process of applying vacuum to rupture the material inside the mold, alone or in combination with the introduction of pressurized fluid, may alter the configuration of the material inside the mold to give the final shape to the molded part. That is, the part may be initially or partially formed by conventional thermoforming or vacuum forming, and the forming may be completed by the application of vacuum and/or pressure to the chamber portion of the molded material. Pressure channels 190 may be configured to further deliver fluid under positive pressure, e.g., to help expand and/or at least partially inflate the chamber portion.

Pressurized fluid may be delivered at a pressure and/or flow rate that is insufficient to rupture the pliable material again. Depending upon the material used, it may be desirable to cool the material and/or the mold, if either was heated during the forming process, before, while, or after the pressurized fluid is delivered. The pressurized fluid itself may cool or contribute to the cooling of the material and/or the mold. This cooling may be relative to an initial heated state, and need not necessarily cool the material to or below room temperature.

Pressurized fluid may be added until a desired pressure and/or volume is achieved inside the chamber. The desired pressure and/or volume will vary depending on the design of the chamber, which will in turn vary depending on the aesthetic design and function of the shoe for which the chamber is intended. The desired chamber pressure may range from 1-51 pounds per square inch gauge (psig) (approximately 6 kPa to 352 kPa), inclusive of endpoints. When the desired pressure and/or volume is achieved or nearly achieved, the opening is sealed, as shown in step 320.

In some embodiments, an initial pressurization step is used as part of the molding process, to form a pre-inflated chamber. Once the pre-inflated chamber is formed, formed part 280 may be moved to a separate manufacturing station, with or without maintaining pressure in the pre-inflated chamber, to perform the final pressurization of the chamber and/or seal opening 285 in formed part 280. Alternately, the pre-inflated chamber may be kept at pressure and sealed, or re-pressurized and sealed in situ. The sealing may begin before the desired pressure or volume is reached, or sealing may begin when the desired pressure or volume is reached, or sealing may begin after the desired pressure or volume is reached. That is, sealing may begin while the chamber is still being pressurized or filled, or sealing may begin while the chamber is at the desired pressure or volume. The sealing process may be finished concurrent with completion of the delivery of the pressurized fluid.

Because of the localized shape of the pliable material (e.g., having conformed to dome-like depression 130 and generally planar area 120), pressurized fluid can be introduced into the chamber through channel 160, or even after formed part 280 has been removed from mold 100, without introducing a needle, nozzle, or other object into the chamber. This means that the rupture in the pliable material can be quite small, from a pinhole just greater than 0 mm to less than approximately 3.5 mm in maximum dimension. As a result, the seam area where the chamber is closed after the pressurized fluid is introduced can be much smaller than the seam generated in conventional processes, which typically insert a nozzle into the chamber for pressurization. Further, the seam can be positioned on a surface that will ultimately face into the shoe, e.g., abutting the inside of the shoe, where a foot would rest when the shoe is worn, and where the seam may be covered by other structures, such as padding, cushioning, a sock liner, etc. In this way, the seam may be both small enough and positioned such that it is not visible in the assembled shoe, even if a significant portion of the chamber is visible. Alternatively, the seam may be positioned against struts, an outer sole, or other structures in the shoe to make the seam less visible, less noticeable, or invisible in the assembled shoe. This positioning is simplified by the reduced size of the seam relative to conventional fluid-filled chambers for shoes.

The pliable material may be a film or membrane. The film or membrane may have a single ply thickness between about 1 and 3 mm, inclusive of endpoints. An exemplary material suitable for forming the chamber is thermoplastic polyurethane (TPU).

In some aspects, a fluid-filled chamber may be formed using the mold, apparatus, and/or methods described herein. The fluid-filled chamber may be a component for a shoe. The component may comprise part of the sole of a shoe. The component may be the entire sole for a shoe. The component may be an insert between the interior of the shoe (e.g., where a foot would reside when the shoe is worn) and the outsole of the shoe (e.g., the portion of the shoe that contacts the ground when worn). A shoe may comprise a window. The fluid-filled chamber component may be at least partially visible when the shoe is assembled. The fluid-filled chamber component may be visible through the window. The window may be a structure comprising a translucent or transparent material, or may be a discontinuity in the structure of the shoe. The window may be an opening in the shoe through which underlying structure is visible.

The fluid-filled chamber component may have exterior-facing and interior-facing surfaces when positioned within a shoe. The exterior-facing surfaces face away from the interior of the shoe, while the interior-facing surfaces face into the shoe. Typically, the visibility of interior-facing surfaces is obstructed by other shoe structures, although it is possible for an interior-facing surface to be visible in an assembled shoe, particularly, but not exclusively, when the shoe is not being worn. Substantially all exterior-facing surfaces of the fluid-filled chamber, such as 75% or more, or 85% or more, or 95% or more, of the exterior-facing surfaces of the fluid-filled chamber may be visible when the shoe is fully assembled. Substantially all exterior-facing surfaces of the fluid-filled chamber component may be visible through a window when the shoe is fully assembled. Substantially all exterior-facing surfaces of the fluid-filled chamber component may be visible, through a window or otherwise, when the shoe is fully assembled, except for the bottom-facing surface. Stated differently, the ground-contact portion of the shoe may obscure the visibility of the fluid-filled chamber component. The ground-contact portion of the shoe could also include windows or discontinuities through which part of the fluid-filled chamber component may be visible. If a shoe comprises multiple fluid-filled chamber components, different fluid-filled chamber components may have different visible portions, in magnitude, position, and/or perspective.

A seal area is created by sealing an opening used to create a fluid-filled chamber component. The seal area may be visually distinct from the chamber material outside the seal area. The seal area may be positioned on the component such that the seal area is not visible when the shoe is fully assembled. Alternately or additionally, the component may be positioned within the shoe such that the seal area is not visible when the shoe is fully assembled. For example, the seal area may be positioned on an internal-facing surface of the component when the shoe is fully assembled. The seal area may be positioned within the shoe such that the seal area is covered by another shoe structure when the shoe is fully assembled, whether the seal-area is exterior-facing or interior-facing. The seal area may be greater than 0 mm and less than approximately 3.5 mm in maximum dimension.

From the foregoing, it will be seen that the disclosed features are well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A mold for forming a pressurized fluid chamber, the mold comprising:
   a generally planar region;
   a dome-shaped depression within the planar region, the dome-shaped depression comprising an opening to an exterior of the mold;
   a compression area bounding the generally planar region and protruding upwardly from a front surface of the mold such that the compression area is raised relative to the generally planar region; and
   a channel through at least two of the generally planar region, the dome-shaped depression, and the compression area, the channel in fluid communication with an area of the mold beyond the compression area.

2. The mold of claim 1, wherein the channel is disposed through all three of the generally planar region, the dome-shaped depression, and the compression area.

3. The mold of claim 1, wherein the opening comprises an oculus that opens through a rear-facing side of the mold to the exterior of the mold.

4. The mold of claim 3, wherein the dome-shaped depression has a diameter between 4 mm and 8 mm.

5. The mold of claim 3, wherein the oculus has a maximum diameter between 2.7 mm and 5.5 mm.

6. A system for inflating a thermoformed fluid chamber, the system comprising:
   a mold, the mold comprising a cavity forming plate and a cap plate, the cavity forming plate comprising:
      a generally planar region;
      a dome-shaped depression within the planar region, the dome-shaped depression comprising an opening to an exterior of the mold;
      a compression area bounding the generally planar region and protruding upwardly from a front surface of the mold such that the compression area is raised relative to the generally planar region;
      a channel through at least two of the generally planar region, the dome-shaped depression, and the compression area, the channel in fluid communication with an area of the mold beyond the compression area; and
      one or more venting apertures outside the compression area;
   the cap plate comprising:
      an aperture in fluid communication with the channel in the cavity forming plate;
      raised regions corresponding to the one or more venting apertures in the cavity forming plate and protruding upwardly from a front surface of the cap plate; and
      one or more pressure channels, the pressure channels in fluid communication with the channel in the cavity forming plate.

7. The system of claim 6, further comprising a seaming apparatus.

8. The system of any of claim 6, wherein the one or more pressure channels can alternately deliver vacuum and positive pressure.

9. The system of any of claim 6, wherein the system further comprises an air pressure delivery tube.

10. The system of claim 9, wherein the air pressure delivery tube is integral to a seaming apparatus.

11. The system of claim 6 further comprising a seaming apparatus, wherein the seaming apparatus employs energy selected from heat, ultrasound, and radio frequency.

12. The system of claim 6, wherein the opening is concave relative to the generally planar region.

13. The system of claim 6, wherein the opening is round.

* * * * *

UNITED STATES PATENT AND TRADEMARK OFFICE
CERTIFICATE OF CORRECTION

PATENT NO. : 10,919,246 B2  
APPLICATION NO. : 16/086268  
DATED : February 16, 2021  
INVENTOR(S) : Eric L. Fliss et al.

Page 1 of 1

It is certified that error appears in the above-identified patent and that said Letters Patent is hereby corrected as shown below:

In the Specification

Column 3, Line 49: Delete "octafluorapropane," and insert -- octafluoropropane, --.
Column 3, Line 49: Delete "hexafluroethane," and insert -- hexafluoroethane, --.
Column 4, Line 38-39: Delete "octafluorapropane," and insert -- octafluoropropane, --.
Column 4, Line 39: Delete "hexafluorethane," and insert -- hexafluoroethane, --.
Column 5, Line 37: Delete "Chamber forming" and insert -- Chamber-forming --.

In the Claims

Column 12, Line 26: Claim 8, before "claim" delete "any of".
Column 12, Line 29: Claim 9, before "claim" delete "any of".

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*